(12) United States Patent
Boutaghou

(10) Patent No.: US 6,717,776 B2
(45) Date of Patent: Apr. 6, 2004

(54) ADJUSTABLE FLY HEIGHT CONTROL USING AN ADJUSTABLE HEAD ACTUATOR ASSEMBLY

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/051,603

(22) Filed: Jan. 17, 2002

(65) Prior Publication Data

US 2002/0097514 A1 Jul. 25, 2002

Related U.S. Application Data

(60) Provisional application No. 60/262,886, filed on Jan. 19, 2001.

(51) Int. Cl.[7] .............................. G11B 5/48; G11B 5/60; G11B 21/21
(52) U.S. Cl. ................................................... 360/294.7
(58) Field of Search .............................. 360/294.7, 294, 360/290, 270, 265.7, 240

(56) References Cited

U.S. PATENT DOCUMENTS

| | | | | |
|---|---|---|---|---|
| 4,954,904 A | * | 9/1990 | Goor | 360/294.7 |
| 5,012,369 A | * | 4/1991 | Owe et al. | 360/294.7 |
| 5,973,886 A | * | 10/1999 | Khuu | 360/254.5 |
| 6,297,937 B1 | * | 10/2001 | Schar | 360/294.7 |
| 6,351,341 B1 | * | 2/2002 | Lee et al. | 360/75 |
| 6,362,933 B1 | * | 3/2002 | Sampietro et al. | 360/110 |
| 6,437,948 B1 | * | 8/2002 | Sugimoto | 360/294.7 |

FOREIGN PATENT DOCUMENTS

| | | |
|---|---|---|
| WO | WO 97/39441 | 10/1997 |
| WO | WO 97/39446 | 10/1997 |

\* cited by examiner

Primary Examiner—Julie Anne Watko
(74) Attorney, Agent, or Firm—Westman, Champlin & Kelly, P.A.; D. Kvale

(57) ABSTRACT

An adjustable height elevation for an actuator arm of an actuator assembly. The height elevation of the actuator arm is adjustable relative to a disc surface for fly height control. The height elevation of the actuator arm is adjusted based upon read-back test data from the head to provide desired fly height control.

20 Claims, 10 Drawing Sheets

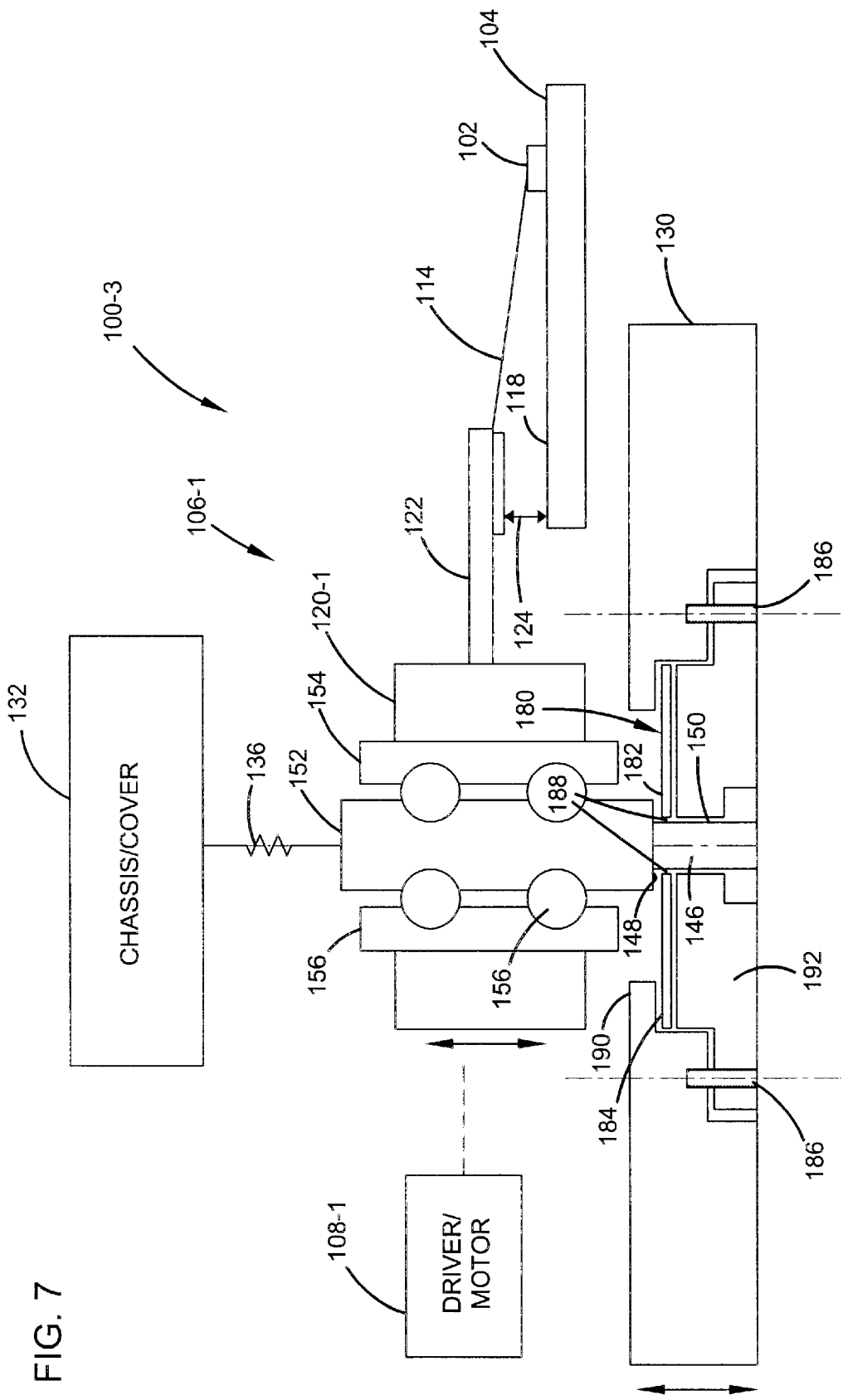

ADJUSTABLE FLY HEIGHT CONTROL USING AN ADJUSTABLE HEAD ACTUATOR ASSEMBLY

CROSS-REFERENCE TO RELATED APPLICATION

This application claims priority from U.S. Provisional Application Ser. No. 60/262,886 filed on Jan. 19, 2001 for inventor Zine-Eddine Boutaghou and entitled FLY HEIGHT CONTROL USING STACK HEIGHT ADJUST FOR SINGLE INTERFACE DISK DRIVES.

FIELD OF THE INVENTION

The present invention relates generally to fly height control for a data head relative to a disc or read-write surface, and more particularly but not by limitation to an adjustable head stack or arm for fly height control.

BACKGROUND OF THE INVENTION

Data storage devices store digital information on a disc or read-write surface. Heads are supported relative to the disc or read-write surface to read data from or write data to the disc. Heads include transducer elements, such as inductive, magnetoresistive and magneto-optical transducer elements, which are carried on an air bearing slider. The slider is coupled to a suspension assembly which supplies a load force to the slider at a load point.

For operation, rotation of the disc creates an air flow along the air bearing of the slider to create a hydrodynamic lifting force. The hydrodynamic lifting force is countered by the load force supplied by the suspension assembly so that the slider or head flies above the disc surface at a fly height defined in part by the hydrodynamic lifting force of the air bearing and the load force supplied by the suspension assembly.

Manufacturing tolerances and variations can introduce variations in the dynamic parameters of the disc drive or in particular, fly height parameters of the head. Variations in fly height parameters can affect read/write resolution and clarity thus affecting operation of the disc drive. Embodiments of the present invention provide solutions to these and other problems, and offer other advantages over the prior art.

SUMMARY OF THE INVENTION

The present invention generally relates to an adjustable interface for fly height control. In particular, the present invention generally relates to an adjustable actuator arm height or elevation relative to the disc surface. The height elevation of the actuator arm is adjustable relative to the disc surface to provide adjustable fly height control. The height elevation of the actuator arm is adjusted based upon read-back data from the head to provide desired fly height control. Other features and benefits that characterize embodiments of the present invention will be apparent upon reading the following detailed description and review of the associated drawings.

BRIEF DESCRIPTION OF THE DRAWINGS

FIG. 7 is a schematic illustration of an embodiment of an actuator assembly including a disc spring interface to supply an adjustable spring force to the actuator body or assembly.

DETAILED DESCRIPTION OF ILLUSTRATIVE EMBODIMENTS

Figure 1:
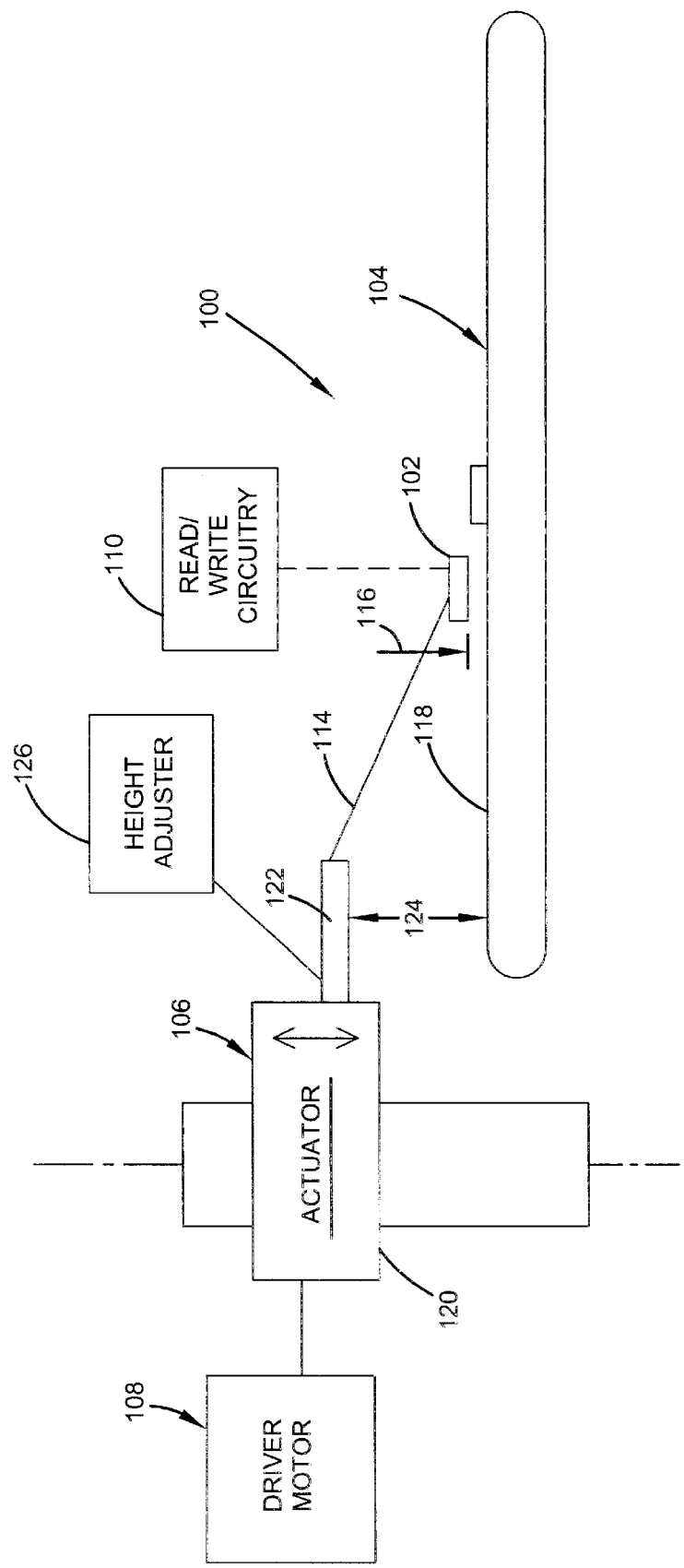
FIG. 1 is a schematic illustration of a data storage device including an embodiment of an actuator assembly including an adjustable actuator arm elevation or height.

FIG. 1 schematically illustrates a data storage device 100 including a data head 102 which is adapted to read data from or write data to a storage disc or media 104. In the illustrated embodiment, the head 102 is carried by an actuator assembly 106 and aligned relative to the disc surface for read/write operations. The actuator assembly 106 is powered by a driver or voice coil motor 108 (illustrated schematically) to position the head 102 across the disc surface (i.e. relative to selected data tracks) for read/write operations. In the illustrated embodiment, the head 102 includes an air bearing slider which carries transducer elements (not shown) for read/write operations. Transducer elements are coupled to read/write circuitry 110 of the device as schematically illustrated which interfaces with a host system as known.

For operation, rotation of the disc 104 creates a hydrodynamic lifting force on the air bearing slider or head 102. The slider or head 102 is coupled to the actuator assembly 106 through a suspension assembly 114. The suspension assembly 114 supplies a load force to the head or slider 102 which counters the hydrodynamic lifting force. The load force and hydrodynamic lifting force define in part a fly height 116 of the slider above a surface 118 of the disc. As previously explained, fly height parameters affect read-write clarity and resolution. Manufacturing tolerances or variations can introduce variations in fly height parameters. The present invention relates generally to a system for compensating for fly height variations.

In the embodiment shown in FIG. 1, the actuator assembly 106 includes an actuator body 120 and at least one actuator arm 122. As shown the actuator arm 122 extends from the actuator body 120 and the suspension assembly 114 and slider 102 are coupled to an extended end thereof. As shown, the arm 122 is supported at an elevation 124 spaced from the disc surface 118. The elevation of the actuator arm 122 affects the fly height of the slider or head 102. Thus, variations in the elevation of arm 122 from the disc surface 118 introduces variations in the fly height parameters of the head or slider 102 which can affect read/write clarity or resolution.

Figure 2:
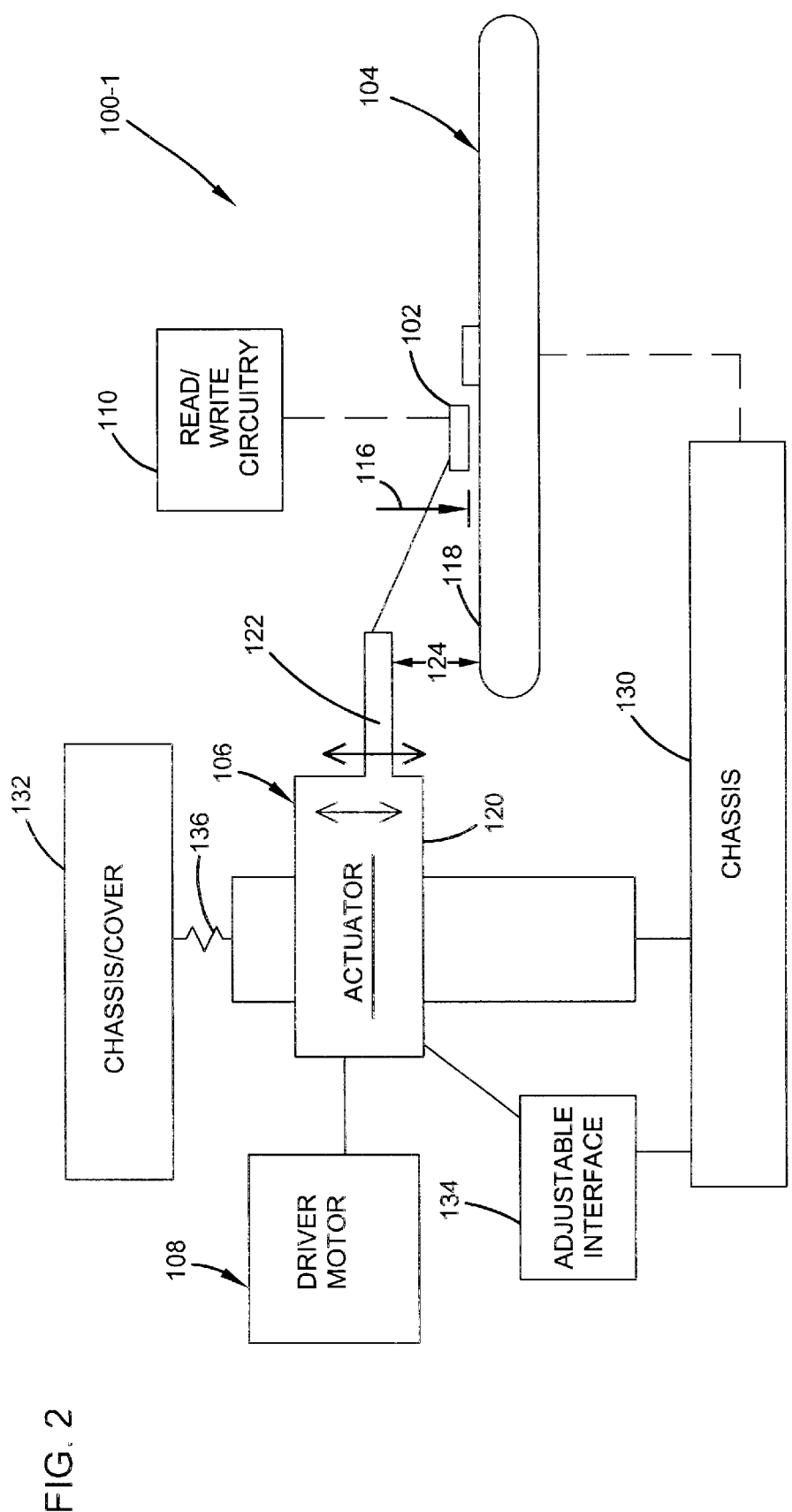
FIG. 2 is a schematic illustration of an embodiment of a device including an adjustable interface between an actuator assembly and a chassis portion to adjust the elevation of the actuator arm.

The device as shown includes a height adjuster 126 (as illustrated schematically) operably coupled to the actuator arm 122 to adjust the elevation height 124 of the arm 122 relative to the disc surface for fly height control. In one embodiment illustrated in FIG. 2, the actuator body 120 is floatably supported between opposed chassis portions 130, 132 (schematically illustrated) and the height adjuster 126 includes an adjustable interface 134 between the chassis and the actuator body 120.

In the particular embodiment shown, the actuator body 120 is floatably supported relative to a spring 136 coupled to chassis portion 132. Spring 136 biases the actuator body 120 towards chassis portion 130. The adjustable interface 134 moves the actuator body 120 against the spring bias to adjust an elevation or offset of the actuator body 120 relative to the chassis to adjust a height elevation of the at least one actuator arm 122. In the particular embodiment shown, the actuator chassis interface 134 is coupled between chassis portion 130 which forms a chassis base of the device and the actuator body 120 to adjust the height of the actuator body 120 and arm 122. Alternatively the actuator body 120 could be biased toward chassis portion 132 or cover and the interface 134 could be coupled between the actuator body 120 and chassis portion or cover 132 to adjust the height elevation of the at least one actuator arm 122 as described.

Figure 3:
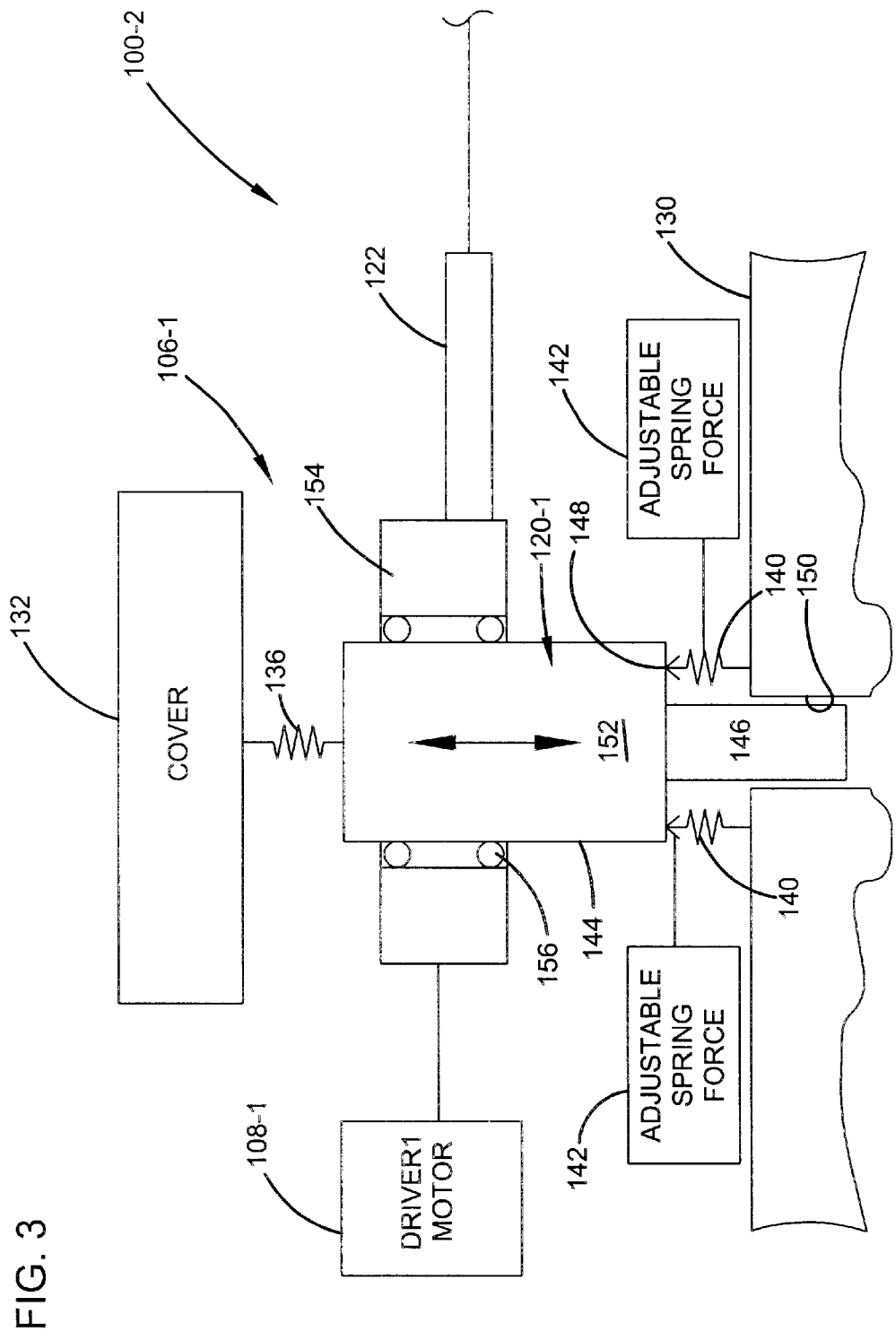
FIG. 3 is a schematic illustration of an embodiment of an actuator assembly including a hub portion and a spindle portion and having an adjustable interface including an adjustable spring force to adjust the height or elevation of the assembly or actuator arm.

In one embodiment illustrated in FIG. 3, where like numbers are used to refer to like parts in the previous FIGS., the adjustable actuator-chassis interface includes a spring 140 which supplies an adjustable spring force as illustrated schematically by block 142 to the actuator body 120-1. As shown, spring 140 is interposed between chassis portion 130 and actuator body 120-1. The adjustable spring force 142 is supplied against the bias of spring 136 to adjust the elevation or position of the actuator body 120-1 to adjust fly height parameters of the head 102.

In the particular embodiment shown in FIG. 3, the actuator body or hub includes a first portion 144 and a second portion 146 and a stepped surface 148 between the first and second portions 144, 146. The second portion 146 is insertable into a channel 150 of the chassis portion 130 and is biased therein by spring 136. Spring 140 is coupled between the stepped surface 148 and chassis portion 130 to supply the adjustable spring force 142 to adjust the elevation of the actuator arm 122.

Figure 4:
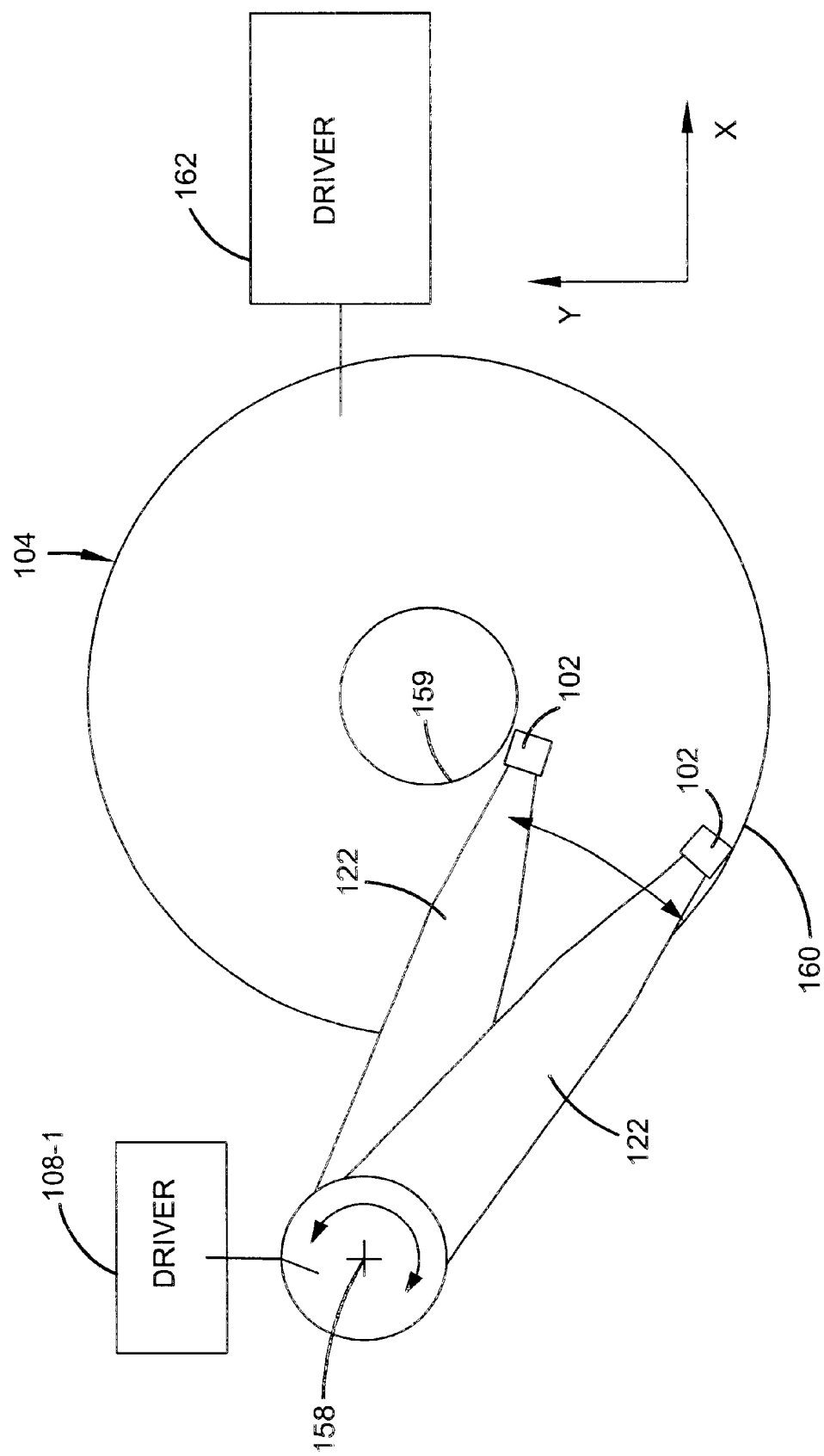
FIG. 4 is a schematic illustration of an embodiment of an actuator assembly movable between an inner portion and an outer portion of a disc for head placement.

The actuator body 120-1 illustrated in FIG. 3 includes a hub portion 152 and a spindle portion 154. The spindle portion 154 is rotationally coupled to the hub portion 152 by a bearing assembly 156. As illustrated in FIG. 4, driver 108-1 rotates spindle portion 154 about axis 158 to move the head 102 between inner and outer portions 159, 160 of the disc 104. In the embodiment shown, hub portion 152 includes the first and second portions 144, 146 and the stepped surface 148 therebetween. As schematically shown, disc 104 is rotated for operation by driver 162. As previously described, rotation of disc 104 creates a hydrodynamic lifting force to the head to fly above the disc surface at a fly height adjustable through the adjustable actuator-chassis interface.

Figure 5:
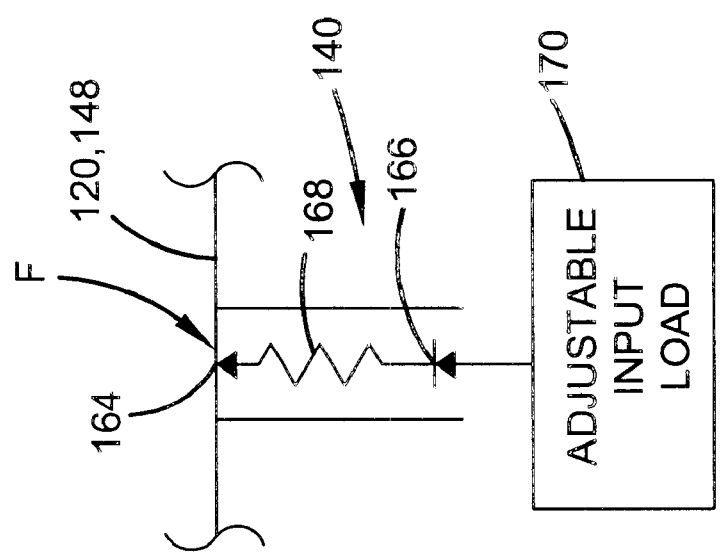
FIG. 5 is a schematic illustration of an embodiment of an interface spring including an adjustable load to supply an adjustable spring force to an actuator body or assembly.

As shown in FIG. 5, spring 140 includes opposed terminals 164, 166 and a spring portion 168 therebetween. Terminal 164 is coupled to the actuator body 120 (or stepped surface 148) to supply the adjustable spring force 142 as described. In the embodiment illustrated in FIG. 5, an adjustable load 170 (illustrated schematically) is supplied to terminal 166 of spring 140 to provide the adjustable spring force 142 as described to adjust elevation or height for fly height control.

Figure 6:
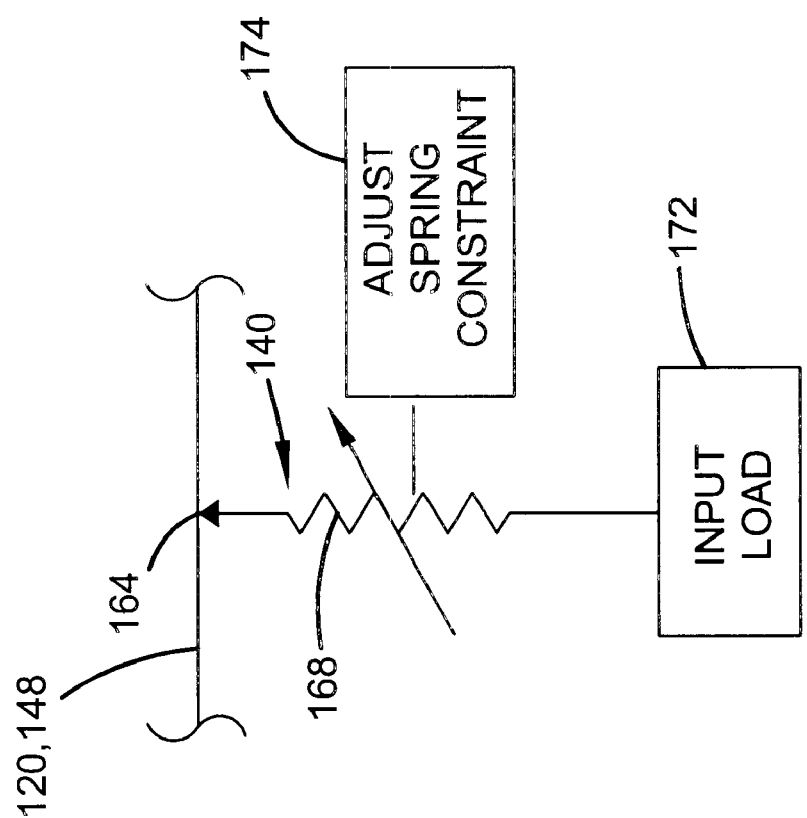
FIG. 6 is a schematic illustration of an embodiment of an interface spring having an adjustable spring constant to supply an adjustable spring force to the actuator body or assembly.

Alternatively as illustrated in FIG. 6, a constant load force as illustrated by block 172 can be supplied and a spring constant 174 of the spring 140 can vary to adjust the spring force 142 supplied to the actuator body 120 (or stepped surface 148) through terminal 164. In particular, the spring force F is provided by $$F = kx \qquad \text{Eq. 1}$$

where k is the spring constant of the spring 140; and x is a distance spring 140 is compressed by input load 172. Thus, k is varied to adjust the spring force F to adjust fly height parameters of the head as described.

Figure 8:
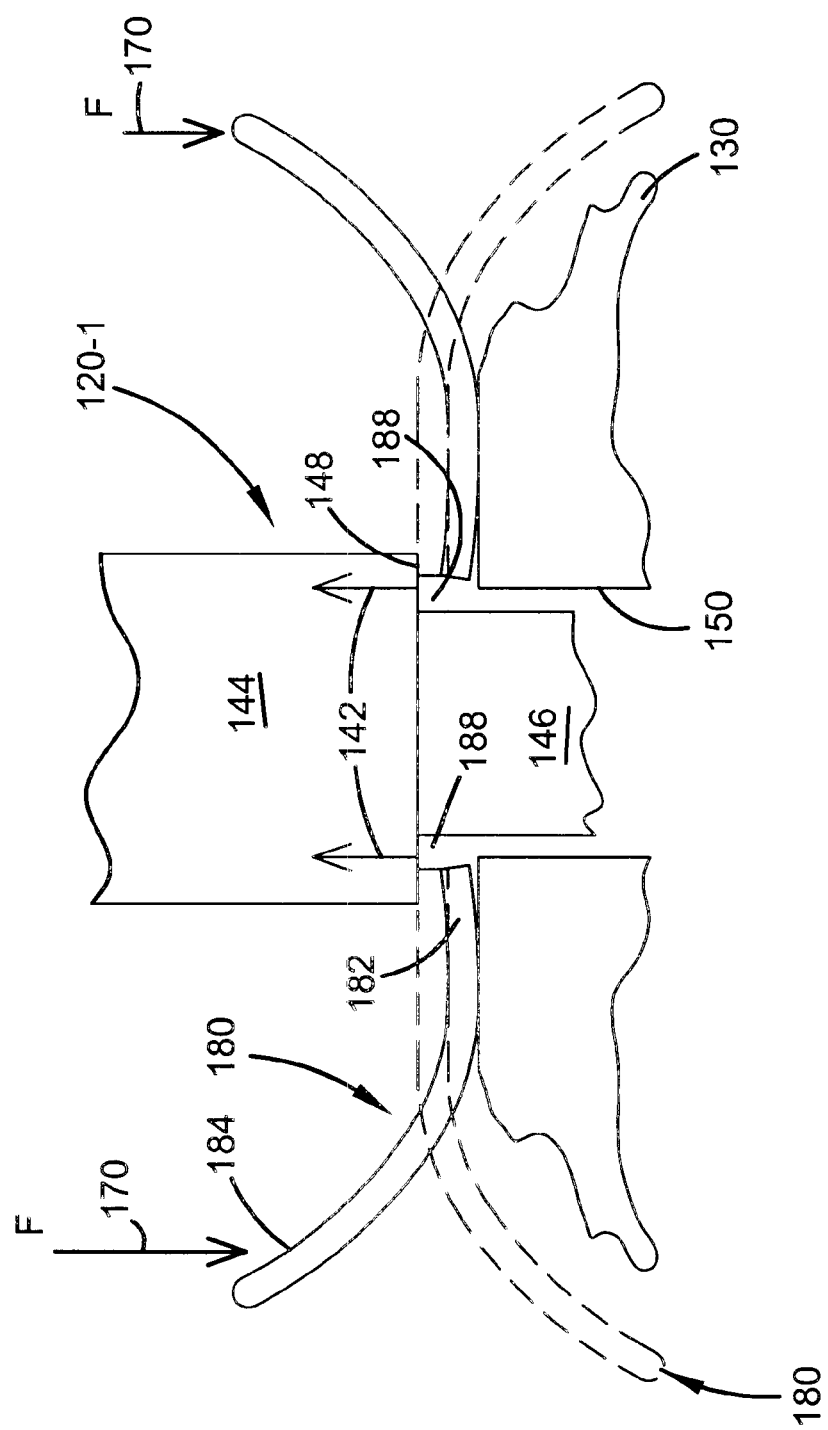
FIG. 8 is a detailed illustration of the disc spring illustrated in FIG. 7 and illustrating a load force supplied to the disc spring to supply a spring force to the actuator body or assembly.

FIGS. 7–8 illustrate one embodiment of an actuator-chassis interface including a disc spring 180 interposed between chassis 130 and actuator body 120-1. In the illustrated embodiment, spring 180 includes an inner portion 182 (or terminal) and an outer portion 184 (or terminal). In the illustrated embodiment, the inner portion 182 is coupled between chassis 130 and stepped surface 148 of the actuator body 120-1 as shown more clearly in FIG. 8. Outer portion 184 is coupled to screws 186, shown in FIG. 7, to supply an adjustable load force 170 to the outer portion 184 of the spring 180 to adjust the spring force supplied to the actuator body 120 or stepped surface 148.

In particular, portion 146 of the actuator body 120-1 extends through spring opening 188 to position the spring 180 between the actuator body 120-1 and chassis portion 130. Chassis portion or base 130 includes opposed plates 190, 192, as shown in FIG. 7, which are operably coupled through screws 186. The outer portion 184 of spring 180 is coupled between plates 190, 192 and plate 192 is movable toward plate 190 by tightening screws 186 to supply the load force to the outer spring portion 184. As exaggeration in FIG. 8, application of load force 170 to the outer spring portion 184 produces an opposite reactive or spring force 142 through the inner spring portion 182 as illustrated in phantom in FIG. 8. The spring force 142 moves actuator body 120-1 against the spring bias toward opposed chassis portion 132 to raise an offset or elevation height of the actuator arm 122 relative to the disc surface 118. Thus, as described, the spring tension can be easily adjusted by tightening or loosening screws 186. This provides advantages over static systems and allows for easy stack or arm adjustments to compensate for variations in fly height parameters.

Figure 9:
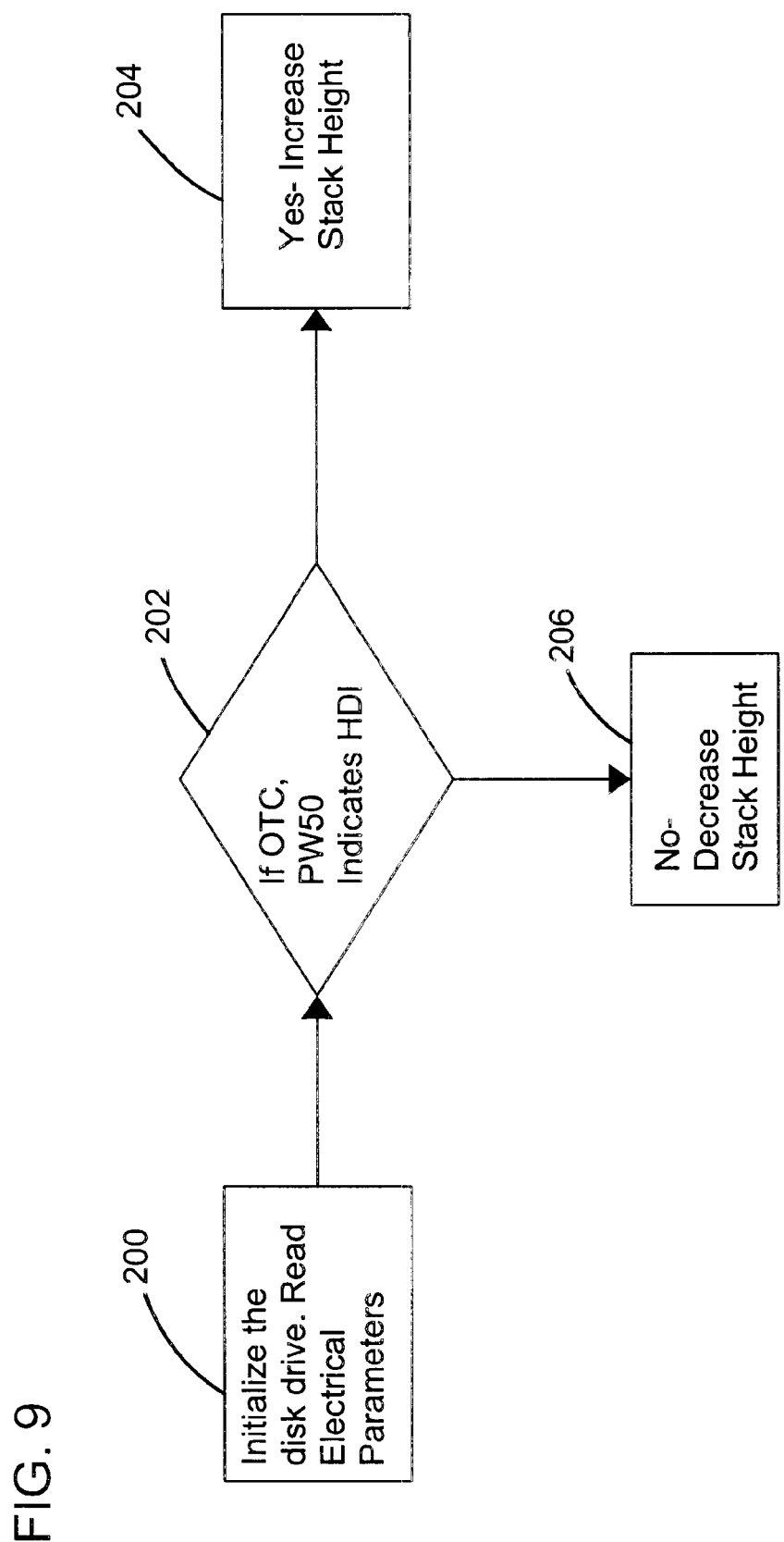
FIG. 9 is a flow chart illustrating testing steps for fly height control.

As illustrated in FIG. 9, stack or actuator height can be adjusted for drive operations based upon test operating parameters. As illustrated by block 200, drive operation is initialized and feedback or read back signals from the transducer elements are provided as illustrated by block 202 to measure read/write clarity or off-track capability (OTC). In particular, if the pulse width (PW) of the read back signal is PW50 (pulse width 50%) then off-track capability is poor and the fly height of the head is below the glide avalanche height of the media resulting in head-disc interface (HDI). Thus, the height of the actuator or arm is raised relative to the disc surface to increase the fly height of the slider as illustrated by block 204 to reduce HDI and improve track following. Alternatively, the actuator assembly or arm 122 is lowered towards the disc surface to lower the fly height of the slider as illustrated by block 206.

Figure 10:
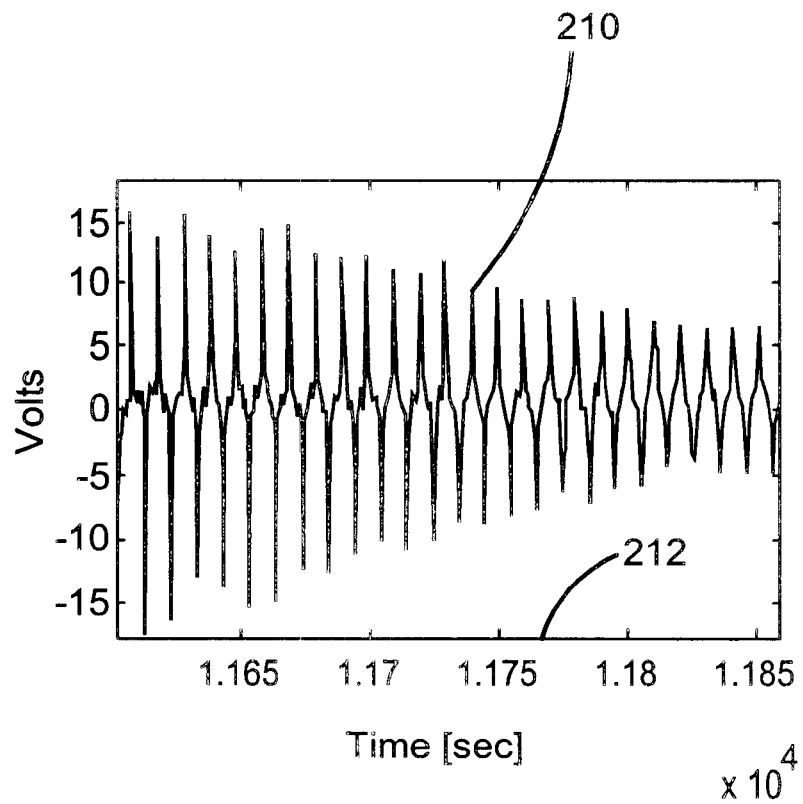
FIGS. 10–11 illustrate embodiments of read-back signals for adjusting fly height parameters.
Figure 11:
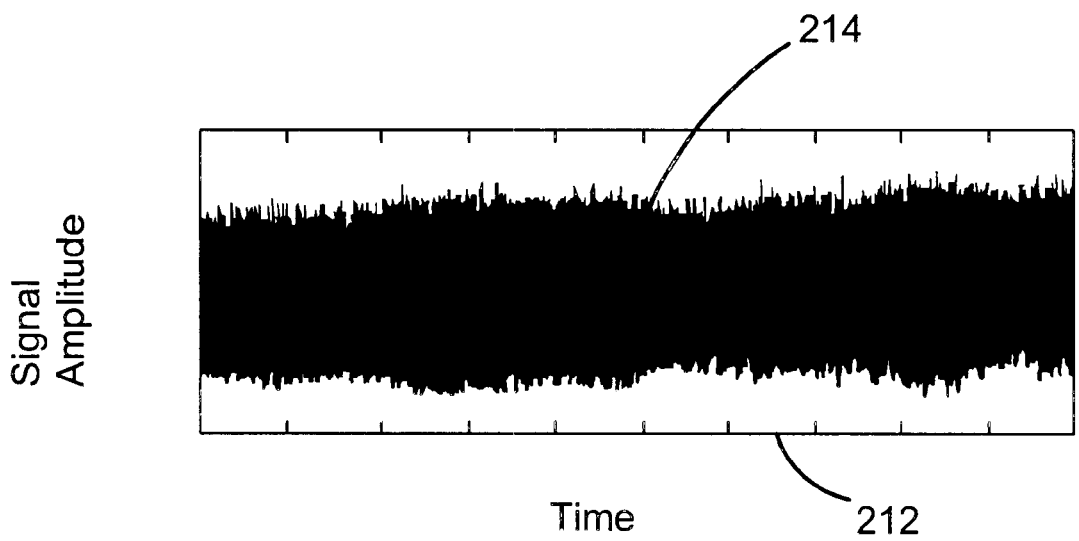

In particular, FIG. 10 illustrates a read-back signal 210 as a function of time 212 for a head which is not able to stay on track indicating head-disc contact and FIG. 11 illustrates read-back modulation 214 due to contact or HDI upon filtering (20–200 kHz). Thus, as explained the actuator assembly or arm is raised relative to the disc surface to increase the fly height of the slider to reduce HDI or signal modulation. Thus, the tested device can be statically adjusted to compensate for manufacturing tolerances or variations compromising read-write resolution and clarity.

Figure 12:
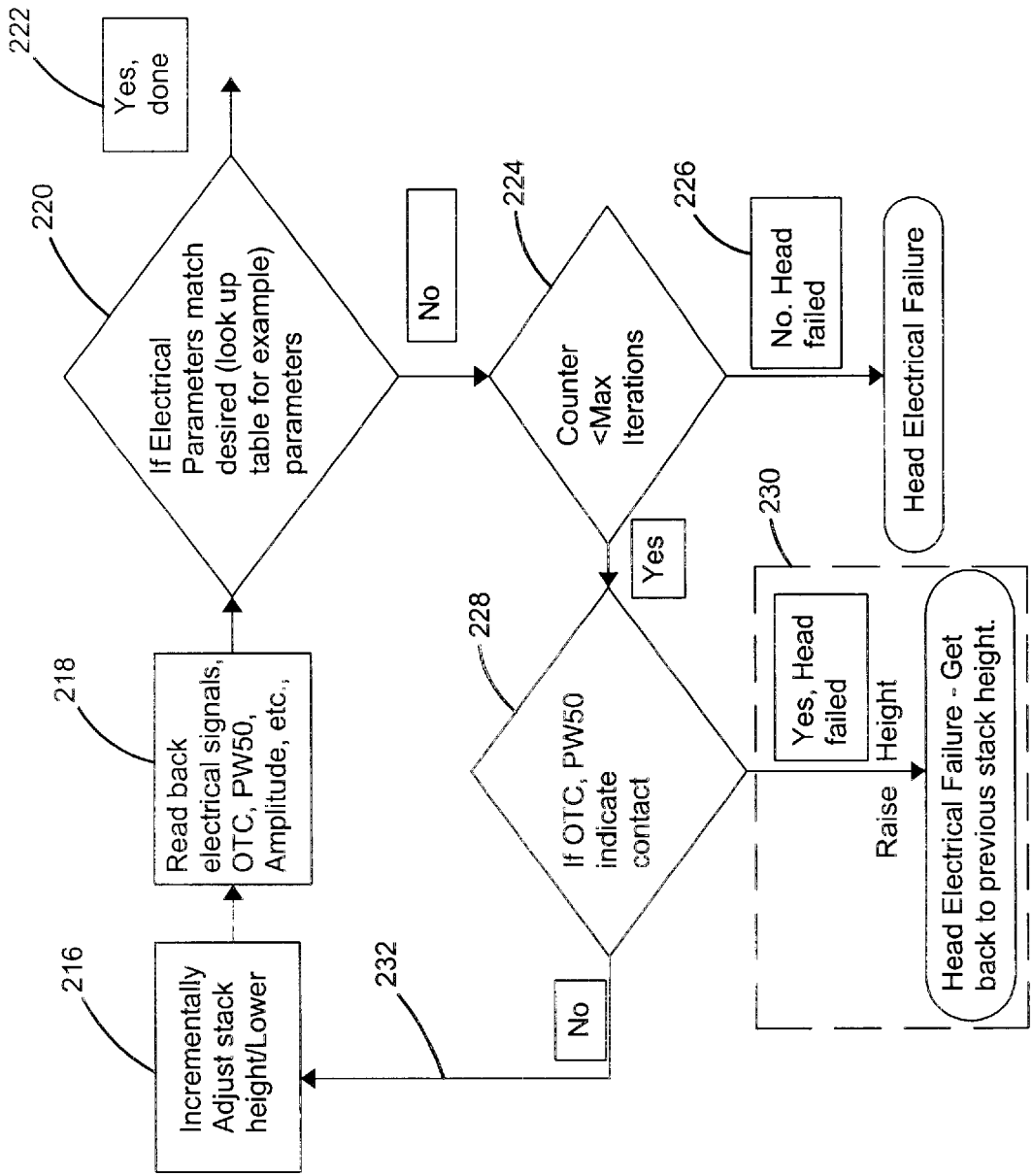
FIG. 12 is a detailed embodiment of testing operation steps for fly height control and adjustment.

FIG. 12 is a more detailed illustration of a testing operation which incrementally adjusts or lowers stack or arm height for test operations as illustrated by block 216. The read-back signal is measured at incremental heights as illustrated by block 218 and compared to desired parameters as illustrated by block 220. The desired parameters are stored in memory or in a look-up table. As illustrated if the read-back signal is acceptable or within desired parameters, then test operation is complete as illustrated by block 222.

If test operations has exhausted maximum incremental height iterations as illustrated by block 224, then the system indicates head failure as illustrated by block 226, otherwise, if the read-back signal is PW50, then contact is indicated as illustrated by block 228 and then the stack or arm height is raised as illustrated by block 230 to a previous stack height. If there is no contact the head is incrementally lowered as illustrated by line 232 for another test iteration. Thus, in the illustrated embodiment, testing operations incrementally test read/write parameters for iterative stack or arm heights for desired fly height control.

An adjustable height elevation for an actuator arm (such as 122) of an actuator assembly (such as 106). The height elevation of the actuator arm (such as 122) is adjustable relative to a disc surface (such as 118) for fly height control. The height elevation of the actuator arm (such as 122) is adjusted based upon read-back data from the head to provide desired fly height control. In one embodiment the elevation of actuator arm (such as 122) is adjusted by an actuator-chassis interface (such as 134) including an adjustable spring force (such as 142) coupleable to the actuator body (such as 120) to adjust a position of the actuator body (such as 120). For simple adjustment control, a screw (such as 186) is coupled to a spring (such as 140, 180) to supply a load force to adjust the spring force supplied to the actuator body or assembly (such as 120, 106).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to optical systems as well, without departing from the scope and spirit of the present invention.

What is claimed is:

1. A head actuator assembly comprising:
    an actuator body coupleable to a chassis and having at least one actuator arm extending therefrom and having a data head coupleable thereto; and
    an adjustable actuator-chassis interface operably coupleable to the actuator body and the chassis and operable to adjust an elevation of the actuator body and the at least one actuator arm relative to the chassis.

2. The head actuator assembly of claim 1 wherein the actuator body includes a first portion and a second portion and a stepped surface between the first portion and the second portion and the first portion is floatably supportable in a channel of the chassis and the adjustable actuator-chassis interface is coupled between the chassis and the stepped surface to adjust spacing between the stepped surface of the actuator body and the chassis.

3. The head actuator assembly of claim 2 wherein the actuator body includes a hub portion and a spindle portion rotatably coupled to the hub portion and the hub portion includes the first portion and the second portion having the stepped surface therebetween.

4. The head actuator assembly of claim 1 wherein the adjustable actuator-chassis interface includes a spring.

5. The head actuator assembly of claim 1 wherein the adjustable actuator-chassis interface includes a spring having a first terminal coupled to the actuator body and a second terminal spaced therefrom and a spring portion between the first and second terminals and the spring being operable to supply a spring force to the first terminal coupled to the actuator body to adjust the elevation of the at least one actuator arm relative to the chassis.

6. The head actuator assembly of claim 1 wherein adjustable actuator-chassis interface includes a spring having opposed first and second terminals and a spring portion therebetween and the first terminal is coupled to the actuator body and the second terminal is adapted to receive an adjustable load force to supply a reactive spring force to the first terminal to adjust a position of the actuator body relative to the chassis.

7. The head actuator assembly of claim 6 wherein a screw is operably coupled to the second terminal to supply the adjustable load force to the second terminal to supply the reactive spring force to the first terminal to adjust the position of the actuator body relative to the chassis.

8. The head actuator assembly of claim 1 wherein the adjustable actuator-chassis interface includes a disc spring having an inner portion and an outer portion coupleable to the actuator body and the chassis and configured to receive a load force and supply an opposed reactive force to the actuator body to adjust a position of the actuator body.

9. The head actuator assembly of claim 8 wherein the inner portion is coupled to the actuator body and the load force is supplied to the outer portion to supply the opposed reactive force to the inner portion coupled to the actuator body.

10. The head actuator assembly of claim 9 wherein the outer portion of the spring is positioned between first and second plates and the second plate is moveable relative to the first plate to supply the load force to the outer portion of the spring.

11. The head actuator assembly of claim 10 wherein a screw movably connects the first and second plates.

12. The head actuator assembly of claim 11 wherein the screw is tightened to raise an elevation of the at least one actuator arm relative to a disc surface.

13. A data storage device comprising:
    a data disc rotationally coupled to a chassis;
    a flexible head suspension assembly including a head;
    an actuator coupled to the chassis having at least one actuator arm at an elevation height spaced from a surface of the data disc and having the flexible head suspension assembly extending therefrom and the actuator being operable to position the head between inner and outer portions of the surface of the data disc; and a height adjuster coupled to the at least one actuator arm to adjust the elevation height of the at least one actuator arm from the surface of the data disc to adjust fly height of the head.

14. The data storage device of claim 13 wherein the height adjuster includes a spring coupled between the actuator and the chassis and adapted to supply an adjustable spring force to the actuator to adjust the elevation height of the at least one actuator arm relative to the surface of the data disc.

15. The data storage device of claim 14 and including a screw operably coupled to the spring to adjust the spring force supplied to the actuator by the spring.

16. The data storage device of claim 13 wherein the height adjuster includes a disc spring.

17. A data storage device comprising:

an actuator having at least one actuator arm having an air bearing slider coupled thereto and the slider coupled to the at least one actuator arm so that an air bearing surface of the slider faces a surface of a data storage disc; and means for adjusting fly height of the air bearing slider relative to the surface of the data storage disc.

18. The data storage device of claim 17 wherein the means for adjusting fly height includes a spring interposed between the at least one actuator arm and a chassis of the data storage device.

19. The data storage device of claim 17 wherein the means for adjusting fly height includes a screw which is selectively tightened to increase the fly height of the slider.

20. A data storage device comprising:

a data disc rotationally coupled to a chassis;

an actuator coupled to the chassis having at least one actuator arm at an elevation height spaced from a surface of the data disc and the actuator being operable to position the head between inner and outer portions of the surface of the data disc; and a height adjuster coupled between the actuator and the chassis to adjust the elevation height of the at least one actuator arm from the surface of the data disc to adjust fly height of the head.

* * * * *